(12) United States Patent
Xiang et al.

(10) Patent No.: US 11,113,234 B2
(45) Date of Patent: Sep. 7, 2021

(54) SEMANTIC EXTRACTION METHOD AND APPARATUS FOR NATURAL LANGUAGE, AND COMPUTER STORAGE MEDIUM

(71) Applicant: TENCENT TECHNOLOGY (SHENZHEN) COMPANY LIMITED, Guangdong (CN)

(72) Inventors: Xiao ming Xiang, Shenzhen (CN); Fei Wang, Shenzhen (CN); Ling Liao, Shenzhen (CN); Xiao bing Feng, Shenzhen (CN); Hao Xu, Shenzhen (CN)

(73) Assignee: TENCENT TECHNOLOGY (SHENZHEN) COMPANY LTD, Guangdong (CN)

( * ) Notice: Subject to any disclaimer, the term of this patent is extended or adjusted under 35 U.S.C. 154(b) by 257 days.

(21) Appl. No.: 16/426,032

(22) Filed: May 30, 2019

(65) Prior Publication Data

US 2019/0278846 A1    Sep. 12, 2019

Related U.S. Application Data

(63) Continuation of application No. PCT/CN2018/075375, filed on Feb. 6, 2018.

(30) Foreign Application Priority Data

Mar. 2, 2017   (CN) .......................... 201710121713.7

(51) Int. Cl.
  G06F 16/00   (2019.01)
  G06N 3/08    (2006.01)
  (Continued)

(52) U.S. Cl.
  CPC .......... G06F 16/00 (2019.01); G06F 16/3329 (2019.01); G06F 16/3344 (2019.01);
  (Continued)

(58) Field of Classification Search
  CPC ........ G06F 16/00; G06F 40/284; G06F 40/30; G06F 16/3329; G06F 16/3344;
  (Continued)

(56) References Cited

U.S. PATENT DOCUMENTS 5,224,040 A * 6/1993 Tou .......................... G06F 40/53
  704/2
5,317,507 A * 5/1994 Gallant ................. G06F 16/355
  715/260

(Continued)

FOREIGN PATENT DOCUMENTS

CN    103474065 A    12/2013
CN    104391963 A     3/2015
(Continued)

OTHER PUBLICATIONS

Rodrygo L. T. Santos, Craig Macdonald, Iadh Ounis, "Intent-aware search result diversification", Jul. 2011, SIGIR '11: Proceedings of the 34th international ACM SIGIR conference on Research and development in Information Retrieval, pp. 595-604 (Year: 2011).*

(Continued)

*Primary Examiner* — Eric Yen
(74) *Attorney, Agent, or Firm* — Sughrue Mion, PLLC

(57) ABSTRACT

A semantic extraction method based on a natural language is provided. In a character library based on a single-character granularity, a character of an input natural language is queried, to obtain first semantic vectors representing semantic descriptions of the character. Candidate semantic intentions corresponding to second semantic vectors and weight vectors corresponding to the candidate semantic intentions are obtained, wherein the second semantic vectors are obtained by using a neural network and correspond to different permutations and combinations of the first semantic vectors. A candidate semantic intention is selected as a final semantic intention of the natural language based on a preset (Continued)

condition, and key information is obtained corresponding to the final semantic intention according to a weight vector corresponding to the final semantic intention.

20 Claims, 7 Drawing Sheets

(51) Int. Cl.
- *G06F 40/30* (2020.01)
- *G06F 40/284* (2020.01)
- *G06F 16/9032* (2019.01)
- *G06F 16/332* (2019.01)
- *G06F 16/33* (2019.01)
- *G10L 15/22* (2006.01)
- *G10L 15/18* (2013.01)

(52) U.S. Cl.
CPC ...... *G06F 16/90332* (2019.01); *G06F 40/284* (2020.01); *G06F 40/30* (2020.01); *G06N 3/08* (2013.01); *G10L 15/1815* (2013.01); *G10L 15/22* (2013.01)

(58) Field of Classification Search
CPC . G06F 16/90332; G06N 3/08; G10L 15/1815; G10L 15/22
See application file for complete search history.

(56) References Cited

U.S. PATENT DOCUMENTS

| | | | | |
|---|---|---|---|---|
| 5,325,298 A * | 6/1994 | Gallant | ........... | G06F 16/355 704/9 |
| 9,959,247 B1 * | 5/2018 | Woo | ........... | G06F 9/30036 |
| 10,257,140 B1 * | 4/2019 | Zukerman | ........... | G06F 16/903 |
| 10,600,406 B1 * | 3/2020 | Shapiro | ........... | G10L 15/22 |
| 2002/0196679 A1 * | 12/2002 | Lavi | ........... | G06F 40/30 365/200 |
| 2003/0055614 A1 * | 3/2003 | Pelikan | ........... | G06N 3/126 703/2 |
| 2003/0187844 A1 * | 10/2003 | Li | ........... | G06F 16/583 |
| 2006/0248071 A1 * | 11/2006 | Campbell | ........... | G06F 40/103 |
| 2008/0168343 A1 * | 7/2008 | Doganata | ........... | G06F 40/169 715/230 |
| 2008/0181505 A1 * | 7/2008 | Wu | ........... | G06F 16/5846 382/190 |
| 2013/0080426 A1 * | 3/2013 | Chen | ........... | G06F 16/583 707/723 |
| 2015/0039301 A1 * | 2/2015 | Senior | ........... | G10L 15/16 704/232 |
| 2016/0247061 A1 * | 8/2016 | Trask | ........... | G06N 3/04 |
| 2017/0060854 A1 * | 3/2017 | Zeng | ........... | G06F 40/55 |
| 2018/0082017 A1 * | 3/2018 | Eugster | ........... | G06F 16/3326 |
| 2018/0203580 A1 * | 7/2018 | Rosenberg | ........... | G06N 3/08 |
| 2018/0204184 A1 * | 7/2018 | Rosenberg | ........... | G06Q 10/103 |
| 2018/0365710 A1 * | 12/2018 | Halecky | ........... | G06F 16/35 |
| 2020/0193217 A1 * | 6/2020 | Shen | ........... | G06N 20/20 |

FOREIGN PATENT DOCUMENTS

| | | |
|---|---|---|
| CN | 104834735 A | 8/2015 |
| CN | 105335398 A | 2/2016 |
| CN | 105894088 A | 8/2016 |
| CN | 106372107 A | 2/2017 |

OTHER PUBLICATIONS

English Translation of International Preliminary Report on Patentability Chapter I for PCT/CN2018/075375, dated Sep. 3, 2019 (Year: 2019).*
English Translation of First Office Action for Application CN 201710121713, dated Apr. 19, 2021 (Year: 2021).*
International Search Report of PCT/CN2018/075375 dated Apr. 12, 2018.
Written Opinion dated Apr. 12, 2018 from the International Bureau in International Application No. PCT/CN2018/075375.

* cited by examiner

SEMANTIC EXTRACTION METHOD AND APPARATUS FOR NATURAL LANGUAGE, AND COMPUTER STORAGE MEDIUM

CROSS-REFERENCE TO RELATED APPLICATION(S)

This application is a continuation of International Application No. PCT/CN2018/075375, filed on Feb. 6, 2018, in the Chinese Patent Office, which claims priority to Chinese Patent Application No. 201710121713.7, filed on Mar. 2, 2017, the disclosures of which are herein incorporated by reference in their entireties.

BACKGROUND

1. Field

The example embodiments relate to the field of information technologies, and in particular, to a semantic extraction method and apparatus based on a natural language, and a computer storage medium.

2. Description of the Related Art

With the development of technologies, a user is enabled to use a natural language to search information or instruct a device to execute a specific operation. In order to achieve this, it is needed that the device identifies the natural language, accurately extracts a user intention, and performs corresponding execution. For example, in an application scenario of voice search, a user voice is input, and after a natural language is identified from the user voice, meanings needs to be extracted from the natural language.

In the related art, to identify Chinese language in a voice, identification is mainly performed by using Chinese word segmentation. Sentence segmentation is performed on an input Chinese sentence according to a probability of a sample word, and then mechanical extraction of meanings is performed based on a regular expression.

However, due to constant development of enormous language families and voices including languages such as Chinese, there exist problems of great difficulty in identification of the natural language, unstable or low identification accuracy, and the like. In the related art, extraction of the meanings is usually performed by using a regular expression with an identification template. However, if matching and identification are performed based on a regular expression, meanings of parts that do not need to be matched are ignored. Consequently, a problem of a high error rate of semantic extraction occurs.

SUMMARY

One or more example embodiments expect to provide a semantic extraction method and a semantic extraction apparatus based on a natural language, to solve the problem that a semantic extraction correction rate and/or accuracy rate based on a natural language is low.

According to an aspect of an example embodiment, provided is a semantic extraction method based on a natural language, in a semantic extraction apparatus including at least one processor. In a character library based on a single-character granularity, a character of an input natural language is queried, to obtain first semantic vectors representing semantic descriptions of the character. Candidate semantic intentions corresponding to second semantic vectors and weight vectors corresponding to the candidate semantic intentions are obtained, wherein the second semantic vectors are obtained by using a neural network and correspond to different permutations and combinations of the first semantic vectors. A candidate semantic intention is selected as a final semantic intention of the natural language based on a preset condition, and key information is obtained corresponding to the final semantic intention according to a weight vector corresponding to the final semantic intention.

According to an aspect of an example embodiment, provided is a semantic extraction apparatus based on a natural language. The apparatus includes at least one memory operable to store program code; and at least one processor operable to read the program code and operate as instructed by the program code. The program code includes query code configured to cause the at least one processor to query, in a character library based on a single-character granularity, a character of an input natural language, to obtain first semantic vectors representing semantic descriptions of the character; first obtaining code configured to cause the at least one processor to obtain second semantic vectors that are obtained by using a neural network and corresponding to different permutations and combinations of the first semantic vectors; second obtaining code configured to cause the at least one processor to obtain candidate semantic intentions corresponding to the second semantic vectors and weight vectors corresponding to the candidate semantic intentions; and selection determining code configured to cause the at least one processor to select a candidate semantic intention as a final semantic intention of the natural language based on a preset condition, and obtain key information corresponding to the final semantic intention according to a weight vector corresponding to the final semantic intention.

According to an aspect of an example embodiment, provided is a non-transitory computer storage medium storing instructions executable by at least one processor to perform: querying in a character library based on a single-character granularity, a character of an input natural language, to obtain first semantic vectors representing semantic descriptions of the character; obtaining candidate semantic intentions corresponding to second semantic vectors and weight vectors corresponding to the candidate semantic intentions, wherein the second semantic vectors are obtained by using a neural network and correspond to different permutations and combinations of the first semantic vectors; and selecting a candidate semantic intention as a final semantic intention of a natural language based on a preset condition, and obtaining key information corresponding to the final semantic intention according to a weight vector corresponding to the final semantic intention.

According to the semantic extraction method and apparatus for a natural language provided in the embodiments, when a sentence of a natural language is obtained, semantic descriptions of each character are obtained character by character based on a single-character granularity, to form first semantic vectors representing meanings of characters; then second semantic vectors corresponding to different permutations and combinations of the first semantic vectors are obtained through permutation and combination. Accordingly, all meanings obtained by permutation and combination of the first semantic vectors of the characters in the natural language may not be lost. With respect to the semantic extraction method that splits the context meanings and that is only based on one or more characters that are successfully matched in templates in the manner of using a regular expression or various matching templates, by using the method of the present disclosure, meaning loss caused by this forced splitting does not occur; by means of subsequent better condition filtering, a most possible candidate semantic intention may be selected from the candidate semantic intentions as a final semantic intention for output, and key information is obtained based on a weight vector. By using the semantic extraction method, when some of the meanings of the characters are not forcibly removed, the correction rate and accuracy of semantic extraction may be ensured again by means of processing of the neural network.

BRIEF DESCRIPTION OF THE DRAWINGS

These and/or other aspects will become apparent and more readily appreciated from the following description of the embodiments, taken in conjunction with the accompanying drawing.

DETAILED DESCRIPTION

Figure 1:
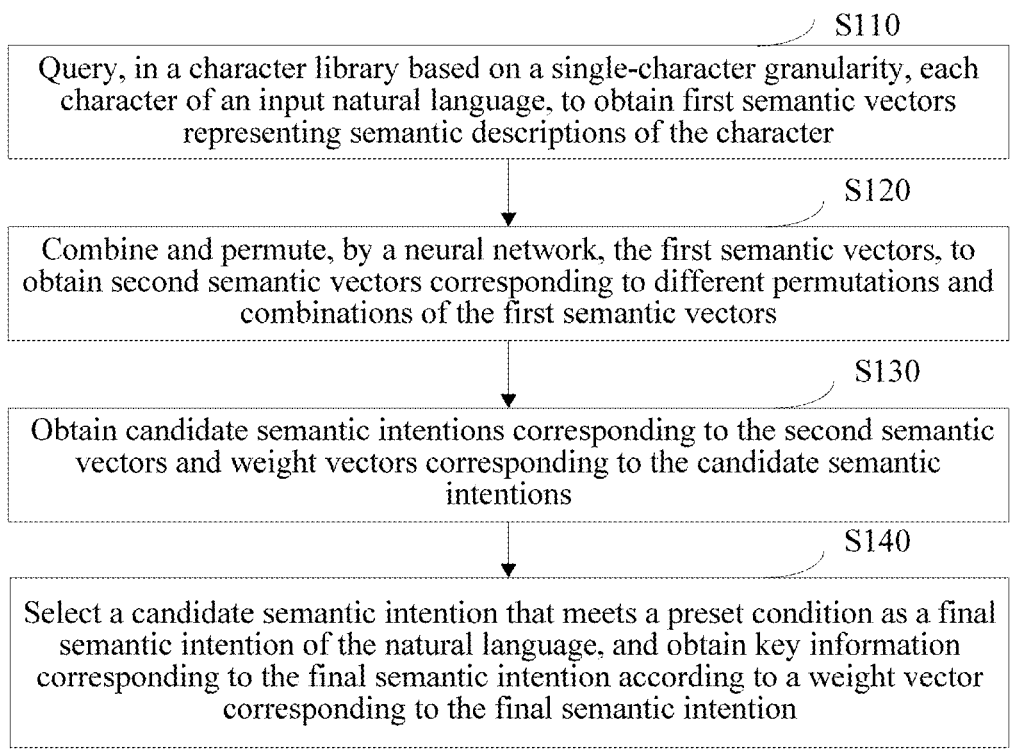
FIG. 1 is a schematic flowchart of a semantic extraction method for a natural language according to an embodiment.

The following further describes the technical solutions of the disclosure with reference to the accompanying drawings and example embodiments. It should be understood that example embodiments described below are merely for illustration and explanation of the disclosure, but not for limiting the disclosure.

As terms used in the embodiments of the disclosure, general terms that are currently used widely were selected as far as possible, in consideration of the functions described in the disclosure. However, the terms may vary depending on the intention of those skilled in the art who work in the pertinent field, previous court decisions or emergence of new technologies, and the like. Also, in particular cases, there may be terms that were designated by the applicant on his own, and in such cases, the meaning of the terms will be described in detail in the relevant descriptions in the disclosure. Thus, the terms used in the disclosure should be defined based on the meaning of the terms and the overall content of the disclosure, but not just based on the names of the terms.

Further, various modifications may be made to the embodiments of the disclosure, and there may be various types of embodiments. Accordingly, specific embodiments will be illustrated in drawings, and the embodiments will be described in detail in the detailed description. However, it should be noted that the various embodiments are not for limiting the scope of the disclosure to a specific embodiment, but they should be interpreted to include all modifications, equivalents or alternatives of the embodiments included in the ideas and the technical scopes disclosed herein. In case it is determined that in describing embodiments, detailed explanation of related known technologies may unnecessarily confuse the gist of the disclosure, the detailed explanation will be omitted.

In addition, the expressions "first," "second" and the like used in the disclosure may be used to describe various elements, but the expressions are not intended to limit the elements. Such expressions are used only to distinguish one element from another element.

Singular expressions may be interpreted to include plural expressions, unless defined differently in the context. In this specification, terms such as "include" and "consist of" should be construed as designating that there are such characteristics, numbers, steps, operations, elements, components or a combination thereof in the specification, but not as excluding in advance the existence or possibility of adding one or more of other characteristics, numbers, steps, operations, elements, components or a combination thereof.

The terms "a module" or "a unit" used in the disclosure are for referring to elements performing at least one function or operation, and these elements may be implemented as hardware or software, or as a combination of hardware and software. Further, a plurality of "modules" or "units" may be integrated into at least one module and implemented as at least one processor, except "modules" or "unit" that need to be implemented as specific hardware.

Hereinafter, embodiments will be described in detail with reference to the accompanying drawings, such that those having ordinary skill in the art to which the disclosure belongs can easily carry out the disclosure. However, it should be noted that the disclosure may be implemented in various different forms, and is not limited to the embodiments described herein. Also, in the drawings, parts that are not related to explanation were omitted, for explaining the disclosure clearly.

As shown in FIG. 1, an embodiment provides a semantic extraction method for a natural language (or a method of extracting semantic information from a natural language), including the following operations:

Operation S110: Query, in a character library based on a single-character granularity, each character of an input natural language, to obtain first semantic vectors representing semantic descriptions of the character.

Operation S120: Combine and permute, by a neural network, the first semantic vectors, to obtain second semantic vectors corresponding to different permutations and combinations of the first semantic vectors.

Operation S130: Obtain candidate semantic intentions corresponding to the second semantic vectors and weight vectors corresponding to the candidate semantic intentions.

Operation S140: Select a candidate semantic intention that meets a preset condition as a final semantic intention of the natural language, and obtain key information corresponding to the final semantic intention according to a weight vector corresponding to the final semantic intention.

The semantic extraction method provided in an example embodiment may be applied to one or more electronic apparatuses including a semantic extraction apparatus for a natural language. For example, the semantic extraction method may be used in a network server on a network side. The semantic extraction apparatus for a natural language includes at least one memory and at least one processor connected to the memory.

Based on receiving a piece of text of the natural language, the network server splits the piece of text into individual characters, and then extracts all semantic descriptions of each character. The semantic descriptions may be understood as descriptions of meaning of the character. The semantic descriptions may be represented by values. For example, a character may include P semantic descriptions, and the first semantic vector may include a vector of P elements. In an example implementation, the first semantic vector may include more than P elements, but the first semantic vector may include an empty element. The empty element may not indicate any semantic description.

For example, the natural language includes S characters, and S first semantic vectors may be formed in operation S110. The first semantic vectors are sequentially input into a neural network according to characters corresponding to the first semantic vectors and position relationships of the characters in the natural language. The neural network processes the first semantic vectors. In the related art, there are technical problems that a substantial amount of semantic descriptions are lost when word segmentation is directly performed on the natural language by using a statistical probability. Example embodiments according to the disclosure solve these problems by maintaining possible expressed semantic descriptions of the natural language to the greatest extent. Each semantic description may be processed, and then a most possible semantic intention and key information associated with the semantic intention are selected for output.

For example, for the natural language "武汉大学生活如何?", if the related art Chinese word segmentation method is used, the natural language is split according to a word having a highest statistical probability at present among various possible words such as "武汉", "大学", "武汉大学", "大学生", and "武汉大学生". If the word "大学" has a highest statistical probability at present, the related art may depart from the existing splitting manner of the language, and splitting is performed by using "大学" as a boundary, to obtain words such as "武汉", "大学", and "生活如何", and then subsequent processing is performed according to meanings of the words. For example, to search information, "大学" may be used as a search focus (or search query). Consequently, other semantic intentions of the natural language are lost. Due to this forced splitting, meanings to be expressed by the natural language cannot be accurately obtained.

In an example embodiment, meanings of characters are obtained by using a single character as a granularity, to generate the first semantic vectors. The first semantic vectors include meanings of all the characters, and accordingly, semantic losses caused by the forced and direct splitting described above do not occur. Therefore, accuracy of extracting the semantic intention and the key information can be improved.

Optionally, operation S120 may include:

combining to form at least one second semantic vector according to permutations of characters in the natural language, the second semantic vector being formed by first semantic vectors corresponding to M characters continuously distributed in the natural language, M being an integer equal to or greater than 1.

For example, a sliding window may be used. One character is used in a sliding operation. All characters located in a same sliding window are sorted to form words. The words have different moving start positions in the sliding window. An $L^{th}$ word may have a start position for $L^{th}$ movement, where L is a positive integer. Each time the sliding window covers all second semantic vectors corresponding to words that may be formed by all adjacent characters in the natural language. In this manner, second semantic vectors corresponding to words formed by one character, two characters, three characters, four characters, or more characters are formed. For example, if the natural language is identified as "武汉大学生", when L is equal to 2, the language is split into "武汉", "大学", and "学生". Thus, even if L is equal to 2, the language is also split into a plurality of combinations according to sliding of the sliding window. One of the combinations corresponds to one second semantic vector. When L is equal to 4, the language may be split at least into indications "武汉大学" and "生". Therefore, the operation of forming different numbers of adjacent characters of the sliding window into words, and then converting the words into the second semantic vectors can maintain the semantic intentions in the natural language to the greatest extent.

Further, operation S120 may include:

performing convolution, by using an N*M convolution window, on the first semantic vectors input according to a permutation sequence of the characters in the natural language, to form a convolutional vector, N being a positive integer, and M being a dimension of the first semantic vectors.

In an example embodiment, M characters are intercepted by directly using the convolution window of a convolutional network, and then the convolutional vector used as the second semantic vector is obtained through convolution.

In an example embodiment, the weight vector may be generated by using a preset method, and several optional manners are provided below:

Optional manner 1: the weight vector is determined according to word attributes of words corresponding to the second semantic vectors. The word attributes may include indication information indicating that the word is a noun, a verb, an adjective, and/or an adverb. Different types of words have different contributions to representing semantic intentions. For example, a weight of a noun may be usually set to be greater than that of an adjective or an adverb, and a weight of a verb may be also set to be greater than that of an adjective or an adverb.

Optional manner 2: the weight vector is determined according to sentence components of words corresponding to the second semantic vectors in a natural sentence. The sentence components may include: a subject, a predicate, an object, and an adverbial. For example, a weight of the adverbial may be less than that of the subject or the predicate.

Optional manner 3: each weight in the weight vector is determined directly according to richness of a semantic description corresponding to each second semantic vector. The richness herein may be determined according to word meaning types included in words corresponding to each second semantic vector, whether a semantic description corresponding to the second semantic vector appears or an appearance probability, or the like.

Permuting and combining the words in the second semantic vector herein may include randomly permuting and combining the words, to obtain phrases. Semantic intentions represented by phrases obtained by different permutations and combinations are different. In view of this, different second semantic vectors in primary segmentation of the natural language may be permutated and combined to obtain third semantic vectors representing different semantic intentions.

In this manner, a new vector is generated. For example, one second semantic vector may include two words: A and B, respectively. After permutation and combination, at least two third semantic vectors are formed. One third semantic vector includes A and B, and the other third semantic vector includes B and A. Different sequences of the two words may result in different semantic intentions.

For another example, one second semantic vector is: words "武汉", "明天", "如何", "天气", and "的"; after the words are sorted again, a third semantic vector: "武汉", "的", "天气", "明天", and "如何" may appear, and a third semantic vector: "武汉", "明天", "的", "如何", and "天气" may also appear. Semantic descriptions of words of each third semantic vector are obtained, and it is found that the meaning expressed by "的" is of little importance, and "的" may be directly deleted. According to parameters such as an appearance probability of meanings expressed by phases or sentences formed by word combination in each third semantic vector, a degree of dependency between the words can be obtained. Usually, in the foregoing example, "武汉" and "明天" both have a high degree of dependency on "天气", and a degree of dependency between "武汉" and "明天" may be relatively low. In an example embodiment, a fourth semantic vector is generated. The fourth semantic vector herein includes an element indicating a semantic description of a word and an element indicating a dependency relationship between words. The fourth semantic vector is input into a classifier, and the classifier may extract a semantic intention according to the fourth semantic vector. Accordingly, the natural language "武汉大学生" may be prevented from being forcibly split into a strange semantic intention, and accuracy of semantic extraction is improved.

Optionally, operation S130 may include:

permuting and combining the second semantic vectors to obtain third semantic vectors;

obtaining the weight vectors according to semantic descriptions of the second semantic vectors; and according to the semantic descriptions of the second semantic vectors in the third semantic vectors and a dependency relationship between semantic descriptions of a plurality of the second semantic vectors, outputting fourth semantic vectors that correspond to the third semantic vectors and represent the candidate semantic intentions.

For example, in a process of moving the sliding window, unnatural words are generated. For example, regarding "武汉明天的天气如何", in a process of sliding (or moving) the sliding window, a word such as "的天" appears. Such a word may have no meaning in a database or may rarely appear according to a statistical probability. In a process of training the neural network, a weight of such a word is set to be small according to a semantic description or a statistical probability of the word. In this manner, during application of the neural network obtained through training, weights corresponding to unnatural words are small. Therefore, the weight vector may indicate importance of the words of the second semantic vector or richness of the semantic descriptions of the words. For example, when "武汉明天的天气如何" is split into "武汉", "明天", "的", "天气", and "如何", the weight is determined according to components of the words in the natural language and/or richness of meanings of the words. In terms of the richness of meanings of the words, upon comparison between "的" and "武汉", the richness of the semantic description of "的" is less than that of the semantic description of "武汉". Formation of the weight vector herein facilitates subsequent selection of these words as key information of the natural language for output according to a size of a weight in the weight vector. In an example embodiment, the first semantic vector is processed by using the neural network, and an algorithm of the weights representing the richness and/or importance of the semantic descriptions of each word is completed in the training phase. Therefore, in an application process, weights of corresponding words can be generated by data processing by directly using the neural network.

The key information may include scenario information, and the scenario information herein may include most core information of the natural language such as time information and address information.

Due to inappropriate splitting of words of some convolutional vectors, words obtained may not generate word meanings in the database. In an example embodiment, this type of third semantic vector is filtered, and after filtering, according to richness and/or importance of semantic descriptions obtained by sequential combination of the words in each third semantic vector, a degree of association between words in one second semantic vector may be learned, to obtain elements representing this degree of association or degree of dependency, to generate the fourth semantic vector.

Operation S140 may include: classifying the fourth semantic vectors by using a classifier, to obtain the final semantic intention.

In an example embodiment, the classifier may be a classifier that is obtained through pre-training by using sample data and that performs classification based on manners such as a probability, for example, a vector classifier. A current most possible final semantic intention may be selected. In an example embodiment, there may be one or more final semantic intentions.

Figure 2:
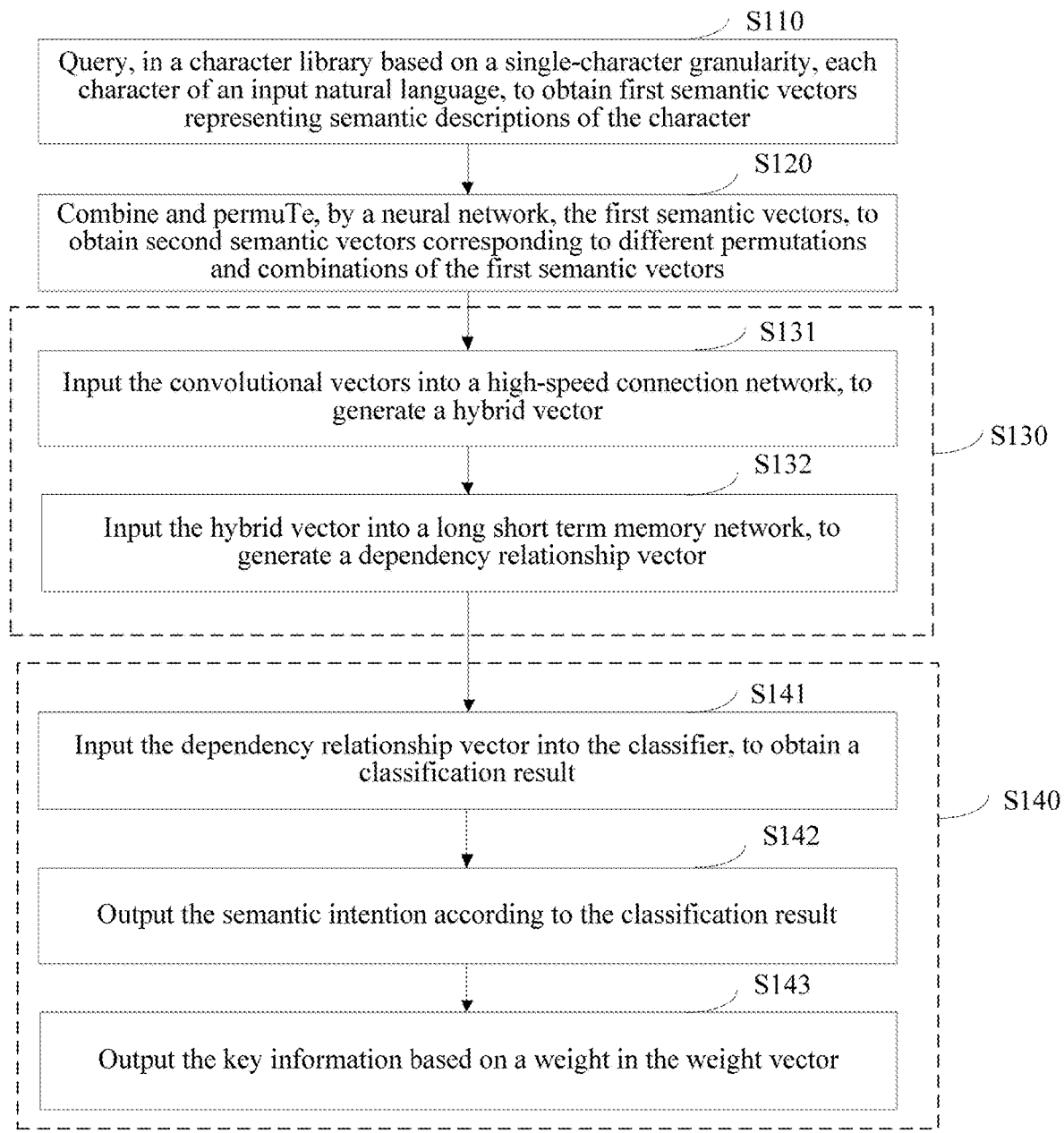
FIG. 2 is a schematic flowchart of a semantic extraction method for a natural language according to an embodiment.

Optionally, operation S120 may include:

inputting the first semantic vectors into a convolutional network, to generate convolutional vectors and weight vectors corresponding to the convolutional vectors;

As shown in FIG. 2, operation S130 may include:

operation S131: Input the convolutional vectors into a high-speed connection network, to generate a hybrid vector; and operation S132: Input the hybrid vector into a long short term memory network, to generate a dependency relationship vector; and operation S140 may include:

operation S141: Input the dependency relationship vector into the classifier, to obtain a classification result;

operation S142: Output the semantic intention according to the classification result; and operation S143: Output the key information based on a weight in the weight vector.

For example, by using Chinese characters as an example, one Chinese character is equivalent to one character, one punctuation is equivalent to one character, and one figure is equivalent to one character.

In an example embodiment, one natural language may consist of a plurality of characters, and each character corresponds to one first semantic vector. The first semantic vectors are sequentially permuted according to permutation sequences of the characters in the natural language, to form a semantic matrix. The semantic matrix is input into the convolution network. In the convolution network, a convolution window equal to different numbers of characters is used to select one or adjacent two or more characters in the semantic matrix to form a word, and then a convolutional vector of the word is obtained. Then each convolutional vector is input into a high-speed connection network, and the high-speed connection network disorganizes elements in each convolutional vector. A plurality of hybrid vectors after sequence disorganization may be generated based on one convolutional vector including a plurality of elements. A hybrid vector corresponding to one convolutional vector is input into the long short term memory network. The long short term memory network is a network that can extract a long-range dependency relationship between different words. An association relationship between words in a convolutional vector corresponding to a hybrid vector may be obtained. In addition, some characters having rare semantic intentions may be filtered or characters having no special meanings in the natural language, for example, a punctuation having no special semantic intention, may be deleted. The long short term memory network finally outputs a dependency relationship vector. The classifier processes the dependency relationship vector. Then the classifier outputs the semantic intention.

There is a correspondence between the dependency relationship vector and the convolutional vector. For example, the dependency relationship vector generated by the long short term memory network is generated based on the convolutional vector A, and based on a weight A in the weight vector of the convolutional vector A being the largest or ranking at one of top positions, the corresponding element in the convolutional vector A is selected as the key information for output.

In an example embodiment, the key information includes scenario information. The scenario information herein may include various information such as time information, location information, and/or people information.

Optionally, the semantic extraction method according to an example embodiment further includes:

pre-generating the character library, the character library including a semantic table, and the semantic table including a correspondence between characters and semantic descriptions of the characters;

training the neural network by using sample data;

obtaining a run log of the neural network; and correcting the neural network according to the run log.

In an example embodiment, before semantic extraction of the natural language is performed, the character library needs to be pre-generated. In an example embodiment, the character library has lots of semantic tables. The semantic tables represent a correspondence between a character and semantic descriptions of the character.

In this manner, after one natural language is obtained, a first semantic vector of each character may be obtained by querying the character library.

In an example embodiment, the neural network is trained by using sample data, to obtain a network parameter of the neural network. After the neural network is put into use, operation of the neural network is further monitored, to obtain a run log of the neural network. The neutral network is constantly optimized and corrected according to the run log, to improve processing accuracy of the neural network, to facilitate subsequent accurate extraction of semantic intentions and key information.

In an example embodiment, the pre-generating the character library includes:

obtaining the characters, the characters including a Chinese standard Chinese character set, Chinese and foreign language punctuations, and foreign language characters;

obtaining the semantic descriptions of the characters; and establishing the semantic table of the characters and meanings of the characters.

The Chinese standard Chinese character set may be existing characters collected into a standard character library, for example, may include common characters and uncommon characters. The common characters are commonly used characters, and the uncommon characters are characters having relatively low frequency. The Chinese and foreign language punctuations may include Chinese characters and foreign language symbols such as English symbols. The foreign language symbols may include characters, figures, and the like of common foreign languages. The common foreign languages herein include English.

Optionally, due to a dynamic change of the language, a great portion of characters generate a great portion of new meanings. In an example embodiment, to prevent the new semantic descriptions of the character that represent new meanings from lowering the accuracy of semantic extraction, the obtaining the semantic descriptions of the characters may include:

obtaining text data from a preset channel; and obtaining characters from the text data, and determining semantic descriptions of the characters according to context of the characters.

The preset channel herein includes a news media channel, a network channel, or a social application channel. In the channels, due to evolution of a language, one character may generate a plurality of new meanings. In an example embodiment, to obtain semantic descriptions of characters as fully as possible, text data is obtained from a preset channel, and is identified. According to a context relationship in corresponding text data, a semantic description of one character in a corresponding scenario is determined. If the semantic description is a new semantic description, a corresponding semantic table is updated.

Figure 3:
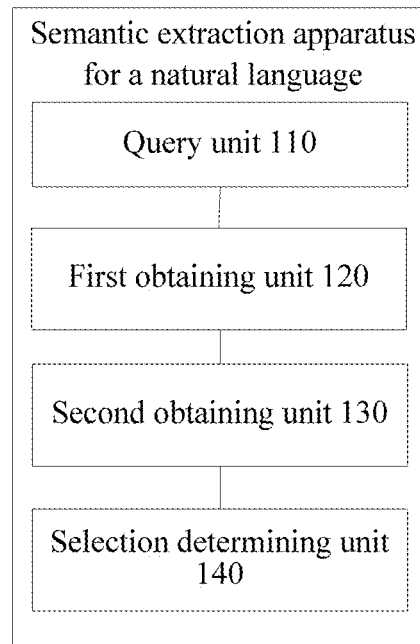
FIG. 3 is a schematic structural diagram of a semantic extraction apparatus for a natural language according to an embodiment.

As shown in FIG. 3, an example embodiment provides a semantic extraction apparatus for a natural language (or an apparatus of extracting semantic information from a natural language). The semantic extraction apparatus may include:

a query unit 110, configured to query, in a character library based on a single-character granularity, each character of an input natural language, to obtain first semantic vectors representing semantic descriptions of the character;

a first obtaining unit 120, configured to combine and permute, by a neural network, the first semantic vectors, to obtain second semantic vectors corresponding to different permutations and combinations of the first semantic vectors;

a second obtaining unit 130, configured to obtain candidate semantic intentions corresponding to the second semantic vectors and weight vectors corresponding to the candidate semantic intentions; and a selection determining unit 140, configured to: select a candidate semantic intention that meets a preset condition as a final semantic intention of the natural language, and obtain key information corresponding to the final semantic intention according to a weight vector corresponding to the final semantic intention.

The semantic extraction apparatus for a natural language provided in an example embodiment is applied to one or more servers, and a plurality of servers may constitute a network platform. The network servers or network platforms are connected to a terminal, and can parse a natural language submitted by the terminal, to obtain the semantic intention and the key information, thereby making a corresponding response.

In an example embodiment, the query unit 110, the first obtaining unit 120, the second obtaining unit 130, and the selection determining unit 140 may all correspond to a processor or a processing circuit. The processor may include a central processing unit, a microprocessor, a digital signal processor, an application processor, a programmable array, or the like. The processing circuit may include an application-specific integrated circuit. The processor or processing circuit may implement functions of the units by executing preset code.

In an example embodiment, the semantic extraction apparatus does not directly perform forced Chinese word segmentation on the natural language, and instead, first extracts semantic descriptions of each character to form the first semantic vector, and inputs first semantic vectors of characters in the natural language into the neural network. Accordingly, the semantic extraction apparatus according to an example embodiment solves the problem in the related art that loss of some semantic descriptions is caused by forced Chinese word segmentation, which results in of inaccurate extraction of semantic intentions and key information. Therefore, the semantic extraction apparatus according to an embodiment improves accuracy in extraction of semantic intentions and key information.

Also, the semantic extraction apparatus processes the first semantic vector by using the neural network, rather than force matching of a regular expression or template as in the related art. Therefore, incorrect extraction of semantic descriptions departing from the context of different characters in the natural language can also be reduced, thereby further improving the accuracy and correctness of semantic extraction.

In some embodiments, the first obtaining unit 120 is configured to combine to form at least one second semantic vector according to permutations of characters in the natural language, the second semantic vector being formed by first semantic vectors corresponding to M characters continuously distributed in the natural language, and M being an integer equal to or greater than 1.

In an example embodiment, the first obtaining unit 120 combines characters at one or more adjacent positions into second semantic vectors corresponding to words according to sequencing of the characters in the natural language. Elements in the second semantic vector may be various coding sequences, values, or the like.

For example, the first obtaining unit 120 is configured to perform convolution, by using an N*M convolution window, on the first semantic vectors input according to a permutation sequence of the characters in the natural language, to form a convolutional vector, N being a positive integer, and M being a dimension of the first semantic vectors.

In an example embodiment, the first semantic vector is processed by using the convolution network. The convolution window is used as the foregoing sliding window. One character is used in a sliding operation. Probabilities of words based on characters in the natural language are obtained to form the convolutional vector. The convolutional vector herein is one of the foregoing second semantic vectors.

Optionally, the second obtaining unit 130 is configured to: permute and combine the second semantic vectors to obtain third semantic vectors; obtain the weight vectors according to semantic descriptions of the second semantic vectors; and according to the semantic descriptions of the second semantic vectors in the third semantic vectors and a dependency relationship between semantic descriptions of a plurality of the second semantic vectors, output fourth semantic vectors that correspond to the third semantic vectors and represent the candidate semantic intentions.

In an example embodiment, a weight vector corresponding to the second semantic vector is further generated. Elements included in the weight vector are weights. Sequencing of the weights in the weight vector are one-to-one corresponding to sequencing of the plurality of second semantic vectors generated by primary permutation and combination of the first semantic vectors. Thus, the key information of the natural language may be conveniently extracted according to the weights.

Optionally, the selection determining unit 140 is configured to classify the fourth semantic vectors by using a classifier, to obtain the final semantic intention.

In an example embodiment, processing on the third semantic vector will be continued. A candidate vector is selected, and a dependency relationship between elements in the candidate vector is obtained. A fourth semantic vector including two elements is generated and is input into a classifier. The classifier may be a learning machine of various types. The classifier such as the learning machine processes the fourth semantic vector, and then outputs the extracted meaning.

Optionally, the selection determining unit 140 is configured to: according to a correspondence between the second semantic vectors and the fourth semantic vectors and a correspondence between the second semantic vectors and the weight vectors, determine a weight vector that extracts the key information; and according to weights in the weight vector, select a character corresponding to a second semantic vector with a weight meeting a preset relationship as the key information for output.

In some other embodiments, the first obtaining unit 120 is configured to input the first semantic vectors into a convolutional network, to generate convolutional vectors and weight vectors corresponding to the convolutional vectors;

the second obtaining unit 130 is configured to: input the convolutional vectors into a high-speed connection network, to generate a hybrid vector; and input the hybrid vector into a long short term memory network, to generate a dependency relationship vector; and the selection determining unit 140 is configured to: input the dependency relationship vector into the classifier, to obtain a classification result; output the semantic intention according to the classification result; and output the key information based on a weight in the weight vector.

In some other embodiments, the semantic extraction apparatus further includes:

a generation unit, configured to pre-generate the character library, the character library including a semantic table, and the semantic table including a correspondence between characters and semantic descriptions of the characters;

a training unit, configured to train the neural network by using sample data;

an obtaining unit, configured to obtain a run log of the neural network; and a correction unit, configured to correct the neural network according to the run log.

The generation unit, the training unit, the obtaining unit, and the correction unit may correspond to or included in a processor or a processing circuit. Reference may be made to the foregoing embodiment(s) for detailed descriptions of the processor or processing circuit.

In an example embodiment, before the first semantic vector is formed by using the character library, the character library and the neural network are further obtained. After generation of the character library and training of the neural network are completed, the character library and the neural network may be used to extract information of the natural language. In an example embodiment, after the neural network is put into operation, the run log is further obtained. The neural network is corrected according to the run log. Thus, the correction rate and accuracy of information extraction of the neural network is ensured.

Optionally, the generation unit is further configured to update the character library according to a preset time interval, so that the character library makes a corresponding change according to changes of meanings of characters in a real world, thereby ensuring accuracy of subsequent information extraction in the natural language. Any two time intervals in the preset time interval herein may be equal or not equal to each other. If any two preset time intervals are equal, the character library is periodically updated.

In some embodiments, the generation unit is configured to: obtain the characters, the characters including a Chinese standard Chinese character set, Chinese and foreign language punctuations, and foreign language characters; obtain the semantic descriptions of the characters; and establish the semantic table of the characters and the semantic descriptions of the characters.

In an example embodiment, the generation unit obtains characters from a plurality of sources, to obtain semantic descriptions of the characters as fully as possible.

In an example embodiment, to obtain changes of the semantic descriptions of the characters, the generation unit is further configured to obtain characters from the text data, and determine semantic descriptions of the characters according to the context relationship of the characters.

Thus, it can be ensured that the semantic descriptions of the characters in the character library reflect the use of the characters in reality, thereby improving identification accuracy.

The following provides several specific examples with reference to any embodiment described above.

Example 1

Figure 4A:
FIG. 4A is a schematic diagram of a natural language collection effect according to an embodiment.
Figure 4B:
FIG. 4B is a schematic diagram of an application effect formed by semantic intentions and key information formed based on a method according to an embodiment.

As shown in FIG. 4A and FIG. 4B, this example provides an application scenario of a semantic extraction method for a natural language. A user terminal receives, by using an audio collection unit (such as a microphone) a natural language input by a user. For example, the user presses and/or holds a speaker button of a recording interface shown in FIG. 4A. The user terminal starts to record, and after recording is completed, a corresponding record is converted into text including one or more characters. The text is based on a natural language corresponding to audio collected by recording. After the natural language is converted into text, extraction of semantic intentions and key information is performed on the language by using the semantic extraction method for a natural language provided in an example embodiment, and then information search is performed according to the obtained semantic intentions and key information, to obtain the search result shown in FIG. 4B. The search result is returned to the user terminal, and the user terminal displays the search result.

Figure 4C:
FIG. 4C is a schematic diagram of an application effect of another semantic extraction method for a natural language according to an embodiment.

FIG. 4C shows an example of another application of the semantic extraction method for a natural language according to an embodiment. The natural language "我搜索附近的肯德基" is received in FIG. 4C, and then the semantic extraction method according to an embodiment shown in FIG. 1 is executed to obtain a search intention of a user and key information. Information is searched according to the obtained search intention and key information. An obtained search result is fed back to a user terminal, and is displayed on a search page of the user terminal.

In this example, the user terminal may be a mobile phone, a tablet computer, a wearable device, or other various electronic devices used by a user.

Example 2

Figure 5:
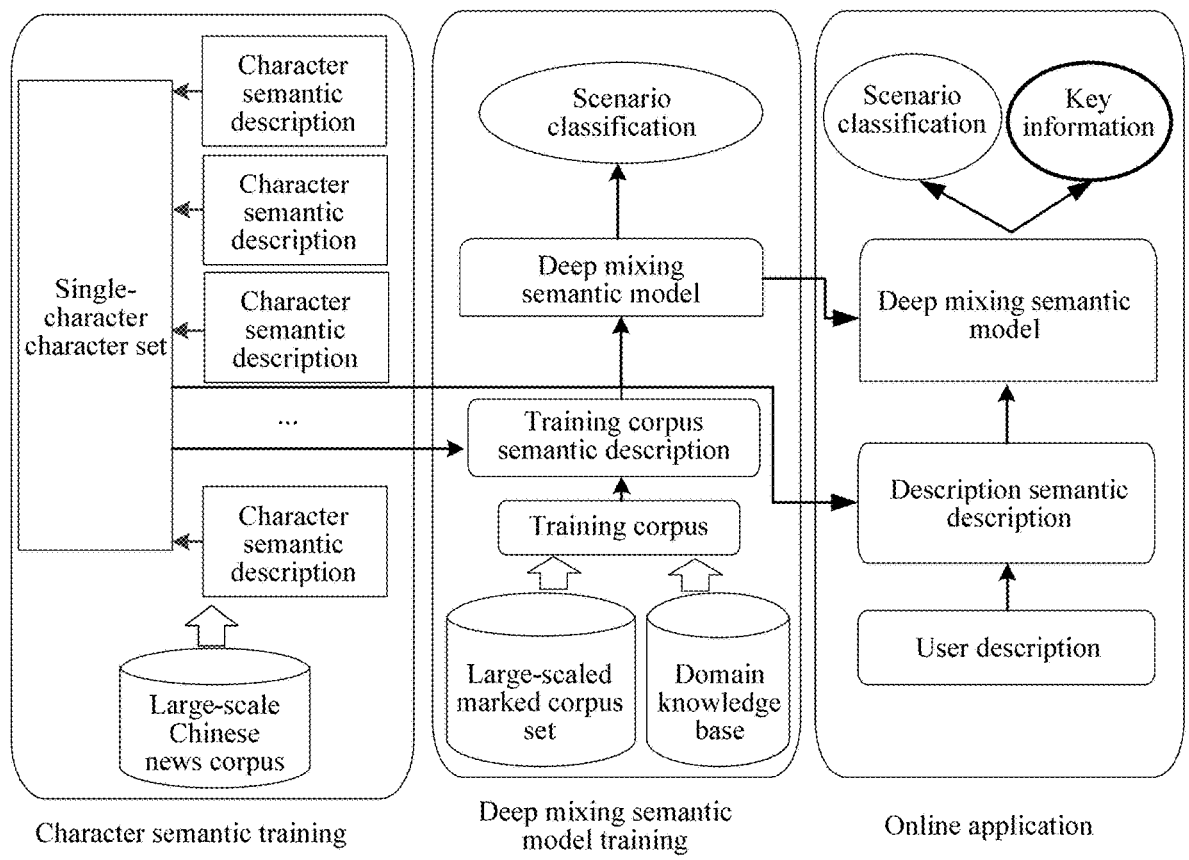
FIG. 5 is a schematic flowchart of a semantic extraction method for a natural language according to an embodiment.

As shown in FIG. 5, this example provides a semantic extraction method for a natural language. The method mainly includes: offline character semantic training, deep mixing semantic model training, and online application. The online application includes scenario information and key information of the input natural language by using a character library obtained through the character semantic training and a neural network obtained through the deep mixing semantic model training.

The character semantic training and the deep mixing semantic model training are respectively described below.

I. Character Semantic Training:

1.1) Selection and Generation of a Character Set:

A Chinese standard Chinese character set (approximately 6000 common characters+14 thousand uncommon characters), Chinese and English punctuations, western language characters (e.g., English and figures) are selected as subsequent corpuses and the standard content described and processed by a user. The following preprocessing is performed on corpus data and user descriptions: traditional Chinese is converted into simplified Chinese, fullwidth forms are converted into halfwidth forms, preprocessed characters that appear outside a character set range are replaced with uniform identifiers, and codes are uniformly converted into 8-bit unicode transformation format (UTF-8) codes.

1.2) Training a semantic description of a single-character granularity by using a word vector model. By using large-scale Chinese news corpuses, semantic descriptions of each character are trained by using the neural network by using a precedence correlation of character appearance.

Figure 6:
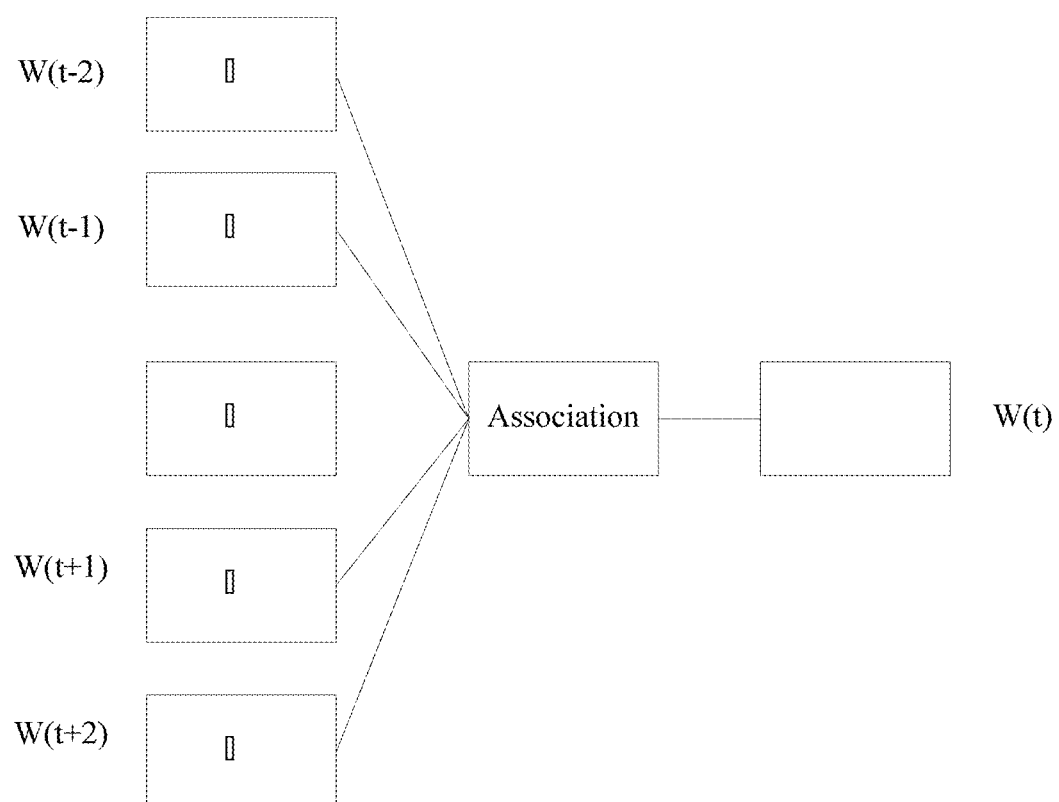
FIG. 6 is a schematic diagram of a continuous bag of words model according to an embodiment.

FIG. 6 is a schematic diagram of an example of a continuous bag of words (CBOW) model. A probability of a current word is predicted by using context. For example, a probability of a current word "足" if the preceding text is "中国", and the following text is "球赛" is predicted. In FIG. 6, W(t) indicates information about "足", t indicates a $t^{th}$ word in a natural language, and t+1 is a character before "足". Characters before and after the $t^{th}$ character are associated to obtain semantic descriptions of the $t^{th}$ character or the probability of each semantic description.

A P-dimension vector description of each character is obtained through training by using the neural network and the model described in section 1.2). P is an integer greater than or equal to 2. In this example, a value of P may be 20, 30, 50, 80, 100, 150, 200, or the like. In this manner, the generated first semantic vector includes P elements, and is a P-dimension vector.

II. Deep Mixing Semantic Model Training 2.1) Large-scale marked corpus set: a marked corpus set is a corpus manually marked for each type of scenario after scenario construction is completed, for example, "武汉的天气如何" corresponds to "天气", and "附近的肯德基" corresponds to "地图", to obtain a training sample.

Domain knowledge base: a substantive library, including address information, music song names, singers, and the like; the knowledge base is constructed into a training corpus according to a scenario to which the knowledge base belongs, as input data for model training.

Figure 7:
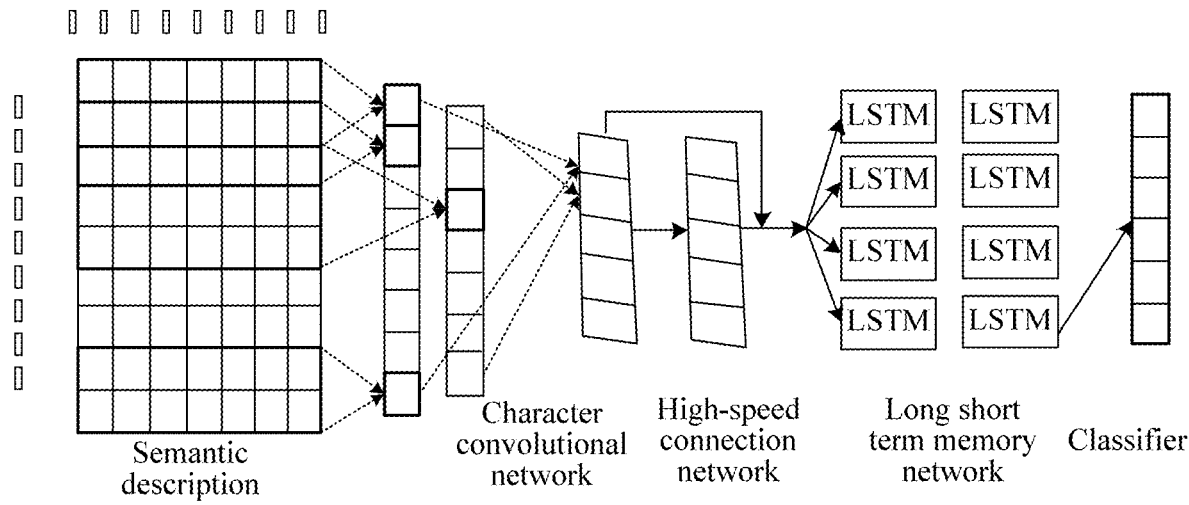
FIG. 7 is a schematic flowchart of another semantic extraction method for a natural language according to an embodiment.

2.2) Deep mixing semantic classification model: the deep mixing semantic model herein may be shown in FIG. 7.

Semantic Description:

A semantic table in a character library is queried to find a semantic vector corresponding to a character of a training corpus, and a semantic matrix is constructed as a model input.

Character Convolutional Network:

Convolution is performed on a semantic matrix by using convolution windows each with a size of N characters, to generate a convolutional vector. The convolutional vector may be used to describe semantic descriptions of words formed by characters. Different descriptions of different combinations are obtained as subsequent network inputs. During online application, the different combinations have different weights, which reflect importance of the combinations to the scenario, and are used as basis for extracting scenario key information. Values of N herein are sequentially 1, 2, 3, 4, and the like.

High-Speed Connection Network:

Semantic mixing is performed, by using the high-speed connection network, on combined semantic descriptions generated by the character convolutional network, and a mixing recalculation is performed on a semantic vector once to achieve an effect of semantic expansion.

Long Short Term Memory Network (LSTM):

Meanings of natural language descriptions have vibration and dependency. To be specific, the components of the descriptions have a mutual dependency relationship. However, the character convolutional network extracts partial information and does not concern this long-range dependency relationship. A semantic vector sequence generated by the character convolutional network is input into the long short term memory network; this semantic dependency relationship is extracted, to finally generate a semantic vector description marking a corpus as an input of a classifier.

Classifier:

The classifier generates a scenario prediction for a semantic vector generated by the long short term memory network, and compares the scenario prediction with a manually marked scenario classification, calculates an error, and inversely updates the error into the entire model for training.

Iterative training is performed on the deep mixing semantic model by using a marked corpus, and a model is obtained by convergence to a preset prediction precision for online prediction.

III. Online Application.

Semantic descriptions of characters in the natural language are queried by using the character library obtained by training, to generate a character semantic vector; an online service is loaded and constructed by using the deep mixing semantic model; for the natural language descriptions input by the user, a scenario classification (error updating is not performed) is output according to operations the same as those of a process of training the deep mixing semantic model; in addition, key information describing the scenario is extracted according to a weight of the character convolutional network as a final output parameter, which is provided for a scenario service for search, and a final representation result is returned.

In some examples, to improve the subsequent extraction precision, iterative updating is further performed on the character library and the neural network. The online service generates a click behavior of a user in a process of using the online service, analyzes corresponding click stream data by using logs, and then performs training and optimization on the model.

The deep mixing semantic model in this example is one of the neural networks.

Example 3

Figure 8:
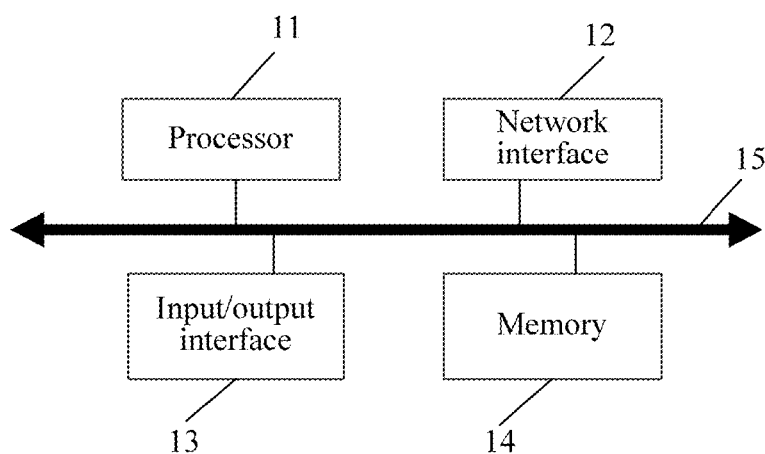
FIG. 8 is a schematic structural diagram of another semantic extraction apparatus for a natural language according to an embodiment.

As shown in FIG. 8, this example provides a schematic diagram of an optional hardware structure of a semantic extraction apparatus for a natural language. The semantic extraction apparatus includes a processor 11, an input/output interface 13 (for example, a display screen, a touch screen, or a speaker), a memory 14, and a network interface 12. The assembly may be connected through a system bus 15 for communication. Correspondingly, the memory 14 stores an executable instruction for performing the semantic extraction method for a natural language according to one or more example embodiments. The hardware modules shown in FIG. 8 may be partially implemented or entirely implemented according to needs, or other hardware modules are implemented. There may be one or more hardware modules of each type. The hardware modules may be implemented at a same geographical location, or distributed at different geographical locations for implementation, and may be configured to implement at least one of the semantic extraction methods for a natural language shown in FIG. 1 and FIG. 2.

In the several embodiments provided in this application, it should be understood that the disclosed apparatus and method may be implemented in other manners. The described apparatus and/or method embodiments are merely exemplary. For example, the unit division is merely logical function division and may be other division during actual implementation. For example, multiple units or components may be merged or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separation parts may be or may not be physically separated. The part used as display unit may be or may not be a physical unit. That is, the units may be located in the same place, or may be distributed to many network units. Some or all of the units need to be selected according to actual requirements to implement the purpose of the solution of the embodiments.

In addition, functional units in the example embodiments may be all integrated in a processing module, each unit is separately used as a unit, or two or more units are integrated in a unit. The integrated unit may be implemented in a form of hardware, or may be implemented in form of hardware plus a software functional unit.

A person of ordinary skill in the art may understand that, some or all of operations for implementing the method embodiments may be implemented by using hardware related to a program instruction. The program may be stored in a computer readable storage medium. When the program is executed, the operations included in the method embodiments are performed. However, the storage medium includes various types of media that may store program code, for example, a mobile storage device, a read-only memory (ROM), a random access memory (RAM), a magnetic disk, or an optical disk.

The descriptions are only specific implementations of the disclosure, but are not intended to limit the protection scope of the disclosure. Any variation or replacement readily figured out by persons skilled in the art within the technical scope disclosed in the disclosure shall fall within the protection scope of the disclosure. Therefore, the protection scope of the disclosure shall be subject to the protection scope of the claims.

INDUSTRIAL APPLICABILITY

In the example embodiments, when semantic extraction is performed on a natural language, the natural language is segmented based on a single-character granularity, to obtain the first semantic vectors formed by semantic descriptions of various individual characters; the first semantic vectors are combined and permutated by using the neural network to obtain the second semantic vectors; the candidate semantic intentions corresponding to the second semantic vectors and the weight vectors corresponding to the candidate semantic intentions are obtained; and the candidate semantic intention that meets the preset condition is selected as the final semantic intention of the natural language, and the key information corresponding to the final semantic intention is obtained according to the weight vector corresponding to the final semantic intention.

In the example embodiments, phase segmentation is not directly performed on a natural sentence based on a statistical probability. Instead, character semantic extraction is performed based on a single-character granularity. In this manner, a semantic omission caused by directly performing phase segmentation may be avoided, and the correction rate and accuracy of semantic extraction may be improved. Therefore, the example embodiments achieve technical benefits and effects that solve the problems in the related art. In the example embodiments, the foregoing solutions may be conveniently implemented by means of, for example, information processing of a neural network, and there are features of simple implementation and a wide application range in the industry.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A semantic extraction method, in a semantic extraction apparatus comprising at least one processor, comprising:
    querying, by the at least one processor, in a character library based on a single-character granularity, a character of a natural language that is input, to obtain first semantic vectors representing semantic descriptions of the character;
    obtaining, by the at least one processor, candidate semantic intentions corresponding to second semantic vectors and weight vectors corresponding to the candidate semantic intentions, wherein the second semantic vectors are obtained by using a neural network and correspond to different permutations and combinations of the first semantic vectors; and
    selecting, by the at least one processor, a candidate semantic intention as a final semantic intention of the natural language based on a preset condition, and obtaining key information corresponding to the final semantic intention according to a weight vector corresponding to the final semantic intention.

2. The method according to claim 1, wherein the natural language includes a plurality of characters, and
    at least one second semantic vector is formed according to permutations of the plurality of characters in the natural language, and based on first semantic vectors corresponding to M characters, among the plurality of characters, continuously distributed in the natural language, M being an integer equal to or greater than 1.

3. The method according to claim 2, wherein the at least one second semantic vector is formed further based on a result of performing convolution, by using an N*M convolution window, on the first semantic vectors, to form convolutional vectors, N being a positive integer, and M being a dimension of the first semantic vectors.

4. The method according to claim 1, wherein the obtaining the candidate semantic intentions comprises:
    obtaining the weight vectors according to semantic descriptions of words in each of the second semantic vectors;
    obtaining third semantic vectors based on permuting and combining the words in each of the second semantic vectors; and
    outputting fourth semantic vectors that correspond to the third semantic vectors and represent the candidate semantic intentions based on a dependency relationship between words in each of the third semantic vectors and further based on semantic descriptions of the words in each of the third semantic vectors.

5. The method according to claim 4, wherein the selecting comprises:
    selecting the final semantic intention based on classification of the fourth semantic vectors by using a classifier.

6. The method according to claim 5, wherein the obtaining the key information comprises:
    selecting, as the key information, a character corresponding to a second semantic vector with a weight meeting a preset relationship among weights in the weight vector corresponding to the final semantic intention, and
    wherein the weight vector corresponding to the final semantic intention is based on a correspondence between the second semantic vectors and the fourth semantic vectors and a correspondence between the second semantic vectors and the weight vectors.

7. The method according to claim 1, wherein the obtaining the candidate semantic intentions comprises:
based on convolutional vectors and weight vectors corresponding to the convolutional vectors obtained by inputting the first semantic vectors into a convolutional network, inputting the convolutional vectors into a high-speed connection network, to obtain a hybrid vector; and
inputting the hybrid vector into a long short term memory network, to obtain a dependency relationship vector, and
the selecting the candidate semantic intention comprises:
inputting the dependency relationship vector into a classifier, to obtain a classification result;
outputting the final semantic intention according to the classification result; and
outputting the key information based on a weight in the weight vector corresponding to the final semantic intention.

8. The method according to claim 1, the method further comprising:
pre-generating the character library, the character library comprising a semantic table, and the semantic table comprising a correspondence between a plurality of characters and semantic descriptions of the plurality of characters;
training the neural network by using sample data;
obtaining a run log of the neural network; and
correcting the neural network according to the run log.

9. The method according to claim 8, wherein the plurality of characters comprise a Chinese standard Chinese character set, Chinese and non-Chinese language punctuations, and non-Chinese language characters.

10. The method according to claim 8, wherein the pre-generating the character library comprises:
obtaining text data from a preset channel;
obtaining the plurality of characters from the text data; and
determining the semantic descriptions of the plurality of characters according to context of the plurality of characters.

11. A semantic extraction apparatus, the apparatus comprising:
at least one memory configured to store program code; and
at least one processor configured to read the program code and operate as instructed by the program code, the program code comprising:
query code configured to cause the at least one processor to query, in a character library based on a single-character granularity, a character of a natural language that is input, to obtain first semantic vectors representing semantic descriptions of the character;
first obtaining code configured to cause the at least one processor to obtain second semantic vectors that are obtained by using a neural network and that correspond to different permutations and combinations of the first semantic vectors;
second obtaining code configured to cause the at least one processor to obtain candidate semantic intentions corresponding to the second semantic vectors and weight vectors corresponding to the candidate semantic intentions; and
selection determining code configured to cause the at least one processor to select a candidate semantic intention as a final semantic intention of the natural language based on a preset condition, and obtain key information corresponding to the final semantic intention according to a weight vector corresponding to the final semantic intention.

12. The apparatus according to claim 11, wherein the natural language includes a plurality of characters, and
the first obtaining code further causes the at least one processor to obtain at least one second semantic vector that is formed according to permutations of the plurality of characters in the natural language, the at least one second semantic vector being based on first semantic vectors corresponding to M characters, among the plurality of characters, continuously distributed in the natural language, M being an integer equal to or greater than 1.

13. The apparatus according to claim 12, wherein the first obtaining code further causes the at least one processor to obtain the at least one second semantic vector based on a result of performing convolution, by using an N*M convolution window, on the first semantic vectors, to form convolutional vectors, N being a positive integer, and M being a dimension of the first semantic vectors.

14. The apparatus according to claim 11, wherein the second obtaining code further causes the at least one processor to:
obtain the weight vectors according to semantic descriptions of words in each of the second semantic vectors;
obtain third semantic vectors based on permuting and combining the words in each of the second semantic vectors; and
output fourth semantic vectors that correspond to the third semantic vectors and represent the candidate semantic intentions based on a dependency relationship between words in each of the third semantic vectors and further based on semantic descriptions of the words in each of the third semantic vectors.

15. The apparatus according to claim 14, wherein the selection determining code further causes the at least one processor to select the final semantic intention based on classification of the fourth semantic vectors by using a classifier.

16. The apparatus according to claim 15, wherein the selection determining code further causes the at least one processor to select, as the key information, a character corresponding to a second semantic vector with a weight meeting a preset relationship among weights in the weight vector corresponding to the final semantic intention, and
wherein the weight vector corresponding to the final semantic intention is based on a correspondence between the second semantic vectors and the fourth semantic vectors and a correspondence between the second semantic vectors and the weight vectors.

17. The apparatus according to claim 11, wherein the second obtaining code further causes the at least one processor to, based on convolutional vectors and weight vectors corresponding to the convolutional vectors obtained by inputting the first semantic vectors into a convolutional network, input the convolutional vectors into a high-speed connection network, to generate a hybrid vector; and input the hybrid vector into a long short term memory network, to obtain a dependency relationship vector; and
the selection determining code further causes the at least one processor to input the dependency relationship vector into a classifier to obtain a classification result, output the final semantic intention according to the classification result, and output the key information based on a weight in the weight vector corresponding to the final semantic intention.

18. The apparatus according to claim 11, wherein the program code further comprises:
  generation code configured to cause the at least one processor to pre-generate the character library, the character library comprising a semantic table, and the semantic table comprising a correspondence between a plurality of characters and semantic descriptions of the plurality of characters;
  training code configured to cause the at least one processor to train the neural network by using sample data;
  third obtaining code configured to cause the at least one processor to obtain a run log of the neural network; and
  correction code configured to cause the at least one processor to correct the neural network according to the run log.

19. The apparatus according to claim 18, wherein the plurality of characters comprise a Chinese standard Chinese character set, Chinese and non-Chinese language punctuations, and non-Chinese language characters.

20. A non-transitory computer storage medium storing instructions executable by at least one processor to perform:
  querying in a character library based on a single-character granularity, a character of a natural language that is input, to obtain first semantic vectors representing semantic descriptions of the character;
  obtaining candidate semantic intentions corresponding to second semantic vectors and weight vectors corresponding to the candidate semantic intentions, wherein the second semantic vectors are obtained by using a neural network and correspond to different permutations and combinations of the first semantic vectors; and
  selecting a candidate semantic intention as a final semantic intention of the natural language based on a preset condition, and obtaining key information corresponding to the final semantic intention according to a weight vector corresponding to the final semantic intention.

* * * * *